United States Patent
Zhang et al.

(10) Patent No.: US 9,274,469 B2
(45) Date of Patent: Mar. 1, 2016

(54) COMPOSITION FOR MAKING FLOW-COATABLE FUSER TOPCOAT AND METHOD OF MAKING A FUSER TOPCOAT

(71) Applicant: Xerox Corporation, Norwalk, CT (US)

(72) Inventors: Qi Zhang, Milton (CA); Nan-Xing Hu, Oakville (CA); Suxia Yang, Mississauga (CA); Sandra J. Gardner, Oakville (CA); Edward G. Zwartz, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/301,421

(22) Filed: Jun. 11, 2014

(65) Prior Publication Data

US 2015/0362877 A1  Dec. 17, 2015

(51) Int. Cl.
*G03G 15/20* (2006.01)
*C08L 29/10* (2006.01)
*B05D 1/30* (2006.01)
*B05D 3/02* (2006.01)

(52) U.S. Cl.
CPC .............. *G03G 15/2057* (2013.01); *B05D 1/30* (2013.01); *B05D 3/0209* (2013.01); *B05D 3/0254* (2013.01); *C08L 29/10* (2013.01)

(58) Field of Classification Search
CPC .......... G03G 15/20; C08L 29/10; B05D 1/30; B05D 3/02

USPC ............................ 524/502; 399/333; 427/144
See application file for complete search history.

(56) References Cited

U.S. PATENT DOCUMENTS

| | | | |
|---|---|---|---|
| 8,337,986 B2 * | 12/2012 | Moorlag | G03G 15/2057 399/333 |
| 2010/0055450 A1 | 3/2010 | Qi et al. | |
| 2010/0086787 A1 | 4/2010 | Qi et al. | |
| 2011/0116849 A1 * | 5/2011 | Qi | G03G 15/2057 399/333 |
| 2013/0017005 A1 | 1/2013 | Zhang et al. | |
| 2013/0059085 A1 | 3/2013 | Qi et al. | |

* cited by examiner

*Primary Examiner* — Michael M Bernshteyn
(74) *Attorney, Agent, or Firm* — MH2 Technology Law Group LLP (57) ABSTRACT

There is provided a homogenous composite dispersion. The composite dispersion is made from ingredients comprising: a first dispersion comprising a filler dispersed in a liquid continuous phase, the filler selected from the group consisting of nanotubes, graphene or a combination thereof, the liquid continuous phase comprising an acid copolymer and a first solvent, the acid copolymer comprising at least one carboxyl functionalized polymeric unit and at least one carboxylate ester functionalized polymeric unit having an alkyl or fluorinated alkyl attached to an oxygen atom of the carboxylate ester; a second dispersion comprising a fluoroplastic dispersed in a second solvent; and a sacrificial polymeric binder material.

18 Claims, 10 Drawing Sheets

COMPOSITION FOR MAKING FLOW-COATABLE FUSER TOPCOAT AND METHOD OF MAKING A FUSER TOPCOAT

FIELD OF THE USE

The present teachings relate generally to a composite dispersion for flow coating, to flow-coatable fluoroplastics used for the topcoat layer of fuser members, and methods of producing the same.

BACKGROUND

In a typical electrophotographic reproducing apparatus, a light image of an original to be copied is recorded in the form of an electrostatic latent image upon a photosensitive member. The latent image is subsequently rendered visible by application of electroscopic thermoplastic resin particles which are commonly referred to as toner. The visible toner image is then in a loose powdered form and is usually fused, using a fusing apparatus, upon a support, which may be an intermediate member, or a print medium such as plain paper.

Conventional fusing apparatuses include a fuser member and a pressure member, which may be configured to include a roll pair maintained in pressure contact or a belt member in pressure contact with a roll member. In a fusing process, heat may be applied by heating one or both of the fuser member and the pressure member.

Fuser members can be coated with layers (e.g., topcoat) of materials having low surface energy (to maintain good release properties), adequate flexibility, good thermal conductivity, and/or mechanical robustness (to extend fuser member life). Fluoropolymer such as perfluoroalkoxy (PFA) resins are often used in topcoats for fuser members because they possess both low surface energy and high mechanical strength.

PFA topcoats are usually prepared as coatings by spray coating or dip coating from aqueous dispersions, powder coating with PFA powders, or as sleeves by extruding PFA resins. As perfluoroplastics such as PFA, PTFE and FEP are highly crystalline fluoropolymers, they are typically insoluble in organic solvent and melt at high temperatures, i.e. about 260 to about 327° C.

Among the coating processes available for topcoat application—including spray coating, flow coating, power coating, and dip coating—flow coating has advantages over other processes because it permits high transfer efficiency (e.g., flow coating provides a more efficient metered coating process, resulting in less wasted coating material, as compared to spray coating which involves overspray loss), high production rate, and avoids toxic airborne atomized PFA particles. Employing flow-coating methods for applying PFA resin particles and like fluoroplastics in dispersion can be difficult compared to spray or dip coating methods. This is because flow-coating has relatively strict conditions for the coating dispersion to be stable and to have suitable rheology.

One example of a stable flow-coatable fluoroplastic topcoat formulation is taught in U.S. Pat. No. 8,588,669, issued on Nov. 19, 2013, to Qi Zhang et al., which includes common inventors with the present disclosure. However, it has been found by the inventors of the present disclosure that when carbon nanotubes are included in the fluoroplastic topcoats of the Zhang patent, flow coating followed by a high temperature baking process results in large voids on the surface and undesirable agglomerates throughout the coating. It is believed that these defects indicate an incompatibility with the nanotube dispersion system being employed.

A novel flow coating composition or flow coating method for manufacturing nanotube/fluoroplastic composites suitable for use as fuser topcoat materials and/or for solving one or more of the aforementioned problems would be considered a notable advancement in the art.

SUMMARY

According to embodiments illustrated herein, there is provided a homogenous composite dispersion. The composite dispersion is made from ingredients comprising: a first dispersion comprising a filler dispersed in a liquid continuous phase, the filler selected from the group consisting of nanotubes, graphene or a combination thereof, the liquid continuous phase comprising an acid copolymer and a first solvent, the acid copolymer comprising at least one carboxyl functionalized polymeric unit and at least one carboxylate ester functionalized polymeric unit having an alkyl or fluorinated alkyl attached to an oxygen atom of the carboxylate ester; a second dispersion comprising a fluoroplastic dispersed in a second solvent; and a sacrificial polymeric binder material.

Another embodiment of the present disclosure is directed to a method of producing a fuser member. The method comprises providing a substrate; providing a first dispersion comprising a filler dispersed in a liquid continuous phase, the filler selected from the group consisting of nanotubes, graphene or a combination thereof and the liquid continuous phase comprising an acid copolymer and a first solvent, the acid copolymer comprising at least one carboxyl functionalized polymeric unit and at least one carboxylate ester functionalized polymeric unit having an alkyl or fluorinated alkyl attached to an oxygen atom of the carboxylate ester; providing a second dispersion comprising a fluoroplastic and a second solvent; mixing the first dispersion, the second dispersion and a sacrificial polymeric binder to form a homogenous composite dispersion; applying the composite dispersion to the substrate by flow coating to form a topcoat; heating the topcoat to a first temperature ranging from about 100° C. to about 280° C.; and heating the topcoat to a second temperature ranging from about 285° C. to about 380° C. to form a uniform topcoat on a fuser member.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.
Flow Coatable Composition The present application is directed to a homogenous composite dispersion. The composite dispersion is made from ingredients comprising: (i) a first dispersion comprising a filler selected from the group consisting of nanotubes, graphene or mixtures thereof dispersed in a liquid continuous phase, the liquid continuous phase comprising an acid copolymer and a first solvent, the acid copolymer comprising at least one carboxyl functionalized polymeric unit and at least one carboxylate ester functionalized polymeric unit having an alkyl or fluorinated alkyl attached to an oxygen atom of the carboxylate ester; (ii) a second dispersion comprising a fluoroplastic dispersed in a second solvent; and (iii) a sacrificial polymeric binder material.

The filler can comprise nanotubes and/or graphene. As used herein and unless otherwise specified, the term "nanotubes" refers to elongated materials (including organic and inorganic materials) having at least one minor dimension, for example, width or diameter, about 100 nanometers or less. Although the term "nanotubes" is referred to throughout the description herein for illustrative purposes, it is intended that the term also encompass other elongated structures of like dimensions including, but not limited to, nanoshafts, nanopillars, nanowires, nanorods, and nanoneedles and their various functionalized and derivatized fibril forms, which include nanofibers with exemplary forms of thread, yarn, fabrics, etc.

In various embodiments, the nanotubes can have an inside diameter and an outside diameter. For example, the inside diameter can range from about 0.5 to about 20 nanometers, while the outside diameter can range from about 1 to about 80 nanometers. The nanotubes can have an aspect ratio, e.g., ranging from about 1 to about 10000.

The term "nanotubes" can also include single wall nanotubes such as single wall carbon nanotubes (SWCNTs), multi-wall nanotubes such as multi-wall carbon nanotubes (MWCNTs), and their various functionalized and derivatized fibril forms such as nanofibers. The term "nanotubes" can further include carbon nanotubes including SWCNTs and/or MWCNTs. Furthermore, the term "nanotubes" can include modified nanotubes from all possible nanotubes described thereabove and their combinations. The modification of the nanotubes can include a physical and/or a chemical modification.

The nanotubes can have various cross sectional shapes, such as, for example, rectangular, polygonal, oval, or circular shape. Accordingly, the nanotubes can have, for example, cylindrical 3-dimensional shapes.

The nanotubes can be formed of conductive or semi-conductive materials. In some embodiments, the nanotubes can be obtained in low and/or high purity dried paper forms or can be purchased in various solutions. In other embodiments, the nanotubes can be available in the as-processed unpurified condition, where a purification process can be subsequently carried out.

The above discussed nanotube and graphene fillers can provide exceptional and desired functions, such as, mechanical, electrical (e.g., conductivity), and thermal (e.g., conductivity) functions to the coating composition and the coated article. In addition, the fillers can be modified/functionalized nanotubes or graphene with controlled and/or increased mechanical, electrical or thermal properties through various physical and/or chemical modifications.

The filler can first be dispersed in a liquid continuous phase in order to form the first dispersion. The liquid continuous phase comprises an acid copolymer and a first solvent.

The acid copolymer includes at least one carboxyl functionalized polymeric unit that is able to react with the surface functional groups on the carbon nanotubes of the composite; and at least one carboxylate ester functionalized polymeric unit that can provide an affinity to the polymer materials in the composite. In an embodiment, the carboxylate ester functionalized group includes an alkyl or fluorinated alkyl that can increase the affinity to the fluoropolymer materials in the composite, such as a $C_1$ to $C_{12}$ alkyl or fluorinated alkyl, a $C_2$ to $C_{10}$ alkyl or fluorinated alkyl, or a $C_4$ to $C_8$ alkyl or fluorinated alkyl.

In an embodiment, the acid copolymer can be a compound of general formula 1:

Where R', R" and R''' can independently be chosen to be a proton, methyl, ethyl, propyl or butyl group; $R^1$ and $R^2$ can independently be chosen to be an alkyl or fluorinated alkyl having 1 to 12 carbon atoms, such as a C or fluorinated alkyl having 1 to 8 carbon atoms, such as a $C_2$ to $C_{10}$ alkyl or fluorinated alkyl, or a $C_4$ to $C_8$ alkyl or fluorinated alkyl, such as —$CH_2CH_2(CF_2)_nCF_3$;

where n ranges from 1 to 5; and x, y and z can represent any desired number of repeating units that would provide the desired dispersant functionality. In an embodiment, one of x and y is 0. Suitable values for x, y and z can range from about 0 or 1 to about 5,000, such as about 5 or 10 to about 2500, or about 50 to about 1200, with the proviso that z and at least one of x or y are 1 or greater. In an embodiment, x, y and z are all at least 1. In an embodiment, there are no other polymeric units in the acid copolymer other than those shown in formula 1. In an embodiment, the weight average molecular weight can range from about 5,000, to about 200,000 or about 10,000 to about 150,000, or about 15,000 to about 100,000. One of ordinary skill in the art would be able to determine suitable values for m and n without undue experimentation given the guidance provided herein.

In an embodiment, the copolymer can include one or more methacrylate polymeric repeating units and at least one methacrylic acid unit. In an embodiment, the copolymer of methacrylic acid is poly(tert-butyl acrylate-coethyl acrylate-co-methacrylic acid), a structural formula for which is shown by formula 2:

(2)

where x, y and z are defined as above for formula 1. Another example is a Poly(methyl methacrylate-co-methacrylic acid) of formula 3:

(3)

where m and n for formula 3 can represent any desired number of repeating units that would provide the desired dispersant functionality. Suitable values for m and n can range from about 1 to about 5,000, such as about 5 or 10 to about 2500, or about 50 to about 1200. In an embodiment, the weight average molecular weight can range from about 5,000, to about 200,000 or about 10,000 to about 150,000, or about 15,000 to about 100,000. One of ordinary skill in the art would be able to determine suitable values for m and n without undue experimentation given the guidance provided herein.

The solvent used in the liquid continuous phase can be any suitable solvent that will allow formation of a dispersion of the nanotubes and that is compatible with the remaining components of the composite dispersion, including the fluoroplastic and the polymer binder. Examples of suitable solvents include acetone, methylethylketone ("MEK"), cyclohexanone ("CHN"), ethyl acetate, methoxy ethyl ether, methylene chloride ($CH_2Cl_2$), and combinations thereof.

One example of a liquid continuous phase for dispersing the filler includes a MEK/CHN solvent system employing poly(tert-butyl acrylate-co-ethyl acrylate-co-methacrylic acid), commercially available as 444790 from Sigma-Aldrich. An ultrasonication process can be used to assist in producing the desired dispersion.

Experiments have shown that dispersion stability of nanotubes is significantly improved when the acid copolymers described herein are employed as a dispersant. For example, a 2% by weight CNT dispersion in MEK remained stable when 1% by weight poly(tert-butyl acrylate-co-ethyl acrylate-co-methacrylic acid) was added to the dispersion, while the same dispersion without the poly(tert-butyl acrylate-co-ethyl acrylate-co-methacrylic acid) did not remain stable. In another example, a dispersion of 2% by weight CNT/2% by weight poly(tert-butyl acrylate-co-ethyl acrylate-co-methacrylic acid) and MEK exhibited well dispersed CNTs in the MEK solvent with bundles of CNT smaller than 1 micron.

The composite dispersions of the present disclosure include a second dispersion comprising a fluoroplastic dispersed in a second solvent. Exemplary materials used for the fluoroplastic can include fluorinated polyalkyenes and fluorinated polyethers. In embodiments, specific examples of fluoroplastics include, but are not limited to, polytetrafluoroethylene (PTFE), perfluoroalkoxy polymer resin (PFA), poly(tetrafluoroethylene-co-perfluoropropyl vinyl ether), fluorinated ethylenepropylene copolymer (FEP), other like fluoroplastics, and combinations thereof. Non-limiting commercially available fluoroplastics include TEFLON® PFA (polyfluoroalkoxypolytetrafluoroethylene), TEFLON® PTFE (polytetrafluoroethylene), or TEFLON® FEP (fluorinated ethylenepropylene copolymer), available from E.I. DuPont de Nemours, Inc. (Wilmington, Del.).

As disclosed herein, the fluoroplastic can be dispersed in solution with a solvent. The solvent can be employed to control the flow coating rheology of the composition. Any suitable solvent that will allow formation of a dispersion of the fluoroplastic and that is compatible with the remaining components of the composite dispersion can be employed. Examples of suitable solvents include any of those listed above for the liquid continuous phase solvent. In an embodiment, the solvent is a ketone, such as acetone, methylethylketone or cyclohexanone, or combinations thereof.

In embodiments, the fluoroplastic dispersion can further include a surfactant. The surfactant can be a methacrylate-based fluorosurfactant. These types of surfactants are described in U.S. Pat. No. 7,462,395, the disclosure of which is incorporated herein by reference in its entirety. Commercially available examples of methacrylate-based fluorosurfactants include, but are not limited to, GF300 and/or GF400 (poly(fluoroacrylate)-graft-poly(methyl methacrylates), available from Toagosei Chemical Industries), and the like and combinations thereof. The surfactant can be present in the dispersion in an amount ranging from about 0.1 wt. % to about 5 wt. %, for example from about 0.5 to about 3 wt. %, such as from about 1 to about 3 wt. %, based on the total weight of the fluoroplastic particles. Without being limited by theory, it is believed that the surfactant can uniformly disperse the fluoroplastics, and any fluorinated fillers, in the dispersion to avoid uneven fluoroplastic clumping. Thus, the dispersion can be easily and uniformly coated onto a substrate, and coating defects (e.g., "barber poles") are minimized or eliminated.

The sacrificial polymeric binder can be employed to stabilize the fluoroplastic in solution. Non-limiting exemplary materials for the sacrificial polymeric binder can include poly(alkylene carbonates), such as poly(propylene carbonate), poly (ethylene carbonate), poly(butylene carbonate), poly(cyclohexene carbonate), and the like, and combinations thereof. In an embodiment, the sacrificial polymeric binder can have a weight average molecular weight ranging from about 50,000 to about 500,000, for example from about 75,000 to about 400,000, such as from about 100,000 to about 200,000. In an aspect, the sacrificial polymeric binder can be a poly(alkylene carbonate). Non-limiting commercially available sacrificial polymeric binder materials can include QPAC® 40 (a poly(propylene carbonate) ("PPC")) having a decomposition point of about 250° C., such as that produced through the copolymerization of carbon dioxide with one or more epoxides, available from Empower Materials (New Castle, Del.).

An important characteristic for the sacrificial polymeric binder is the ability to be removed from the final topcoat. Any residual may remain inert to the final topcoat, so that the sacrificial polymeric binder does not deleteriously affect the final properties of the topcoat after decomposition. The sacrificial polymeric binder can be selected to decompose at a temperature below the melting temperature of the fluoroplastic. In an embodiment, binders that decompose at higher temperatures (such as >320° C.), e.g. polyvinylbutyral (PVB) and acrylic polymers are not desirable herein. In an embodiment, the sacrificial polymeric binder can be poly(propylene carbonate) and the like, which decomposes into water and carbon dioxide.

The fluoroplastic can be present in the final composite dispersion, after mixing with a sacrificial polymeric binder, in an amount ranging from about 20 to about 60 percent, for example from about 25 to about 50 percent, such as from about 30 to about 40 percent, based on the total weight of the dispersion. The sacrificial polymeric binder can be present in the composite dispersion in an amount ranging from about 1 to about 30 percent, for example from about 2 to about 20 percent, such as from about 5 to about 10 percent, based on the amount of total solids in the dispersion. Total solids content can be calculated by any known method in the art. See, e.g., *Determination of Total Solids in Resin Solutions*, McKinney et al., *Ind. Eng. Chem. Anal. Ed.*, 1946, 18 (1), pp 14-16. The dispersion can have a viscosity ranging from about 50 cP to about 1,000 cP.

Without being limited by theory, it is believed that the sacrificial polymeric binder can stabilize the flow-coatable fluoroplastics in the dispersion such that the dispersion can be uniformly coated onto a substrate by flow coating methods to form a smooth, uniform topcoat layer. In other words, the sacrificial polymeric binder, having appropriate molecular weight and viscosity in solvent liquid continuous phase, can provide the dispersion with stability and suitable rheology so that it can be applied using flow coating methods. Unlike fluoroelastomers, such as Viton elastomers which are typically soluble in solvent, fluoroplastics (such as the PFA fluoroplastics discussed above) are typically insoluble and difficult to use in flow coating methods. In this way, the sacrificial polymeric binder can help stably suspend the flow-coatable fluoroplastics in a dispersion. The dispersion can then be applied using flow coating methods.

After flow coating, the sacrificial polymeric binder can be removed (e.g., by decomposing, evaporating, burning away, or the like) by heating at a temperature above its melting point. Thus, the sacrificial polymeric binder is removable from the final PFA topcoat, and does not affect the final properties of the topcoat. In this way, a fluoroplastic that is otherwise difficult to stabilize in solutions or dispersions may be used in flow coating methods to form the fuser topcoat.

In embodiments, the dispersion can further include an additive material including, but not limited to, silica, clay, metal oxides nanoparticles, carbon nanotubes, carbon nanofibers, and the like.

Method of Making the Composite Dispersion

Figure 1:
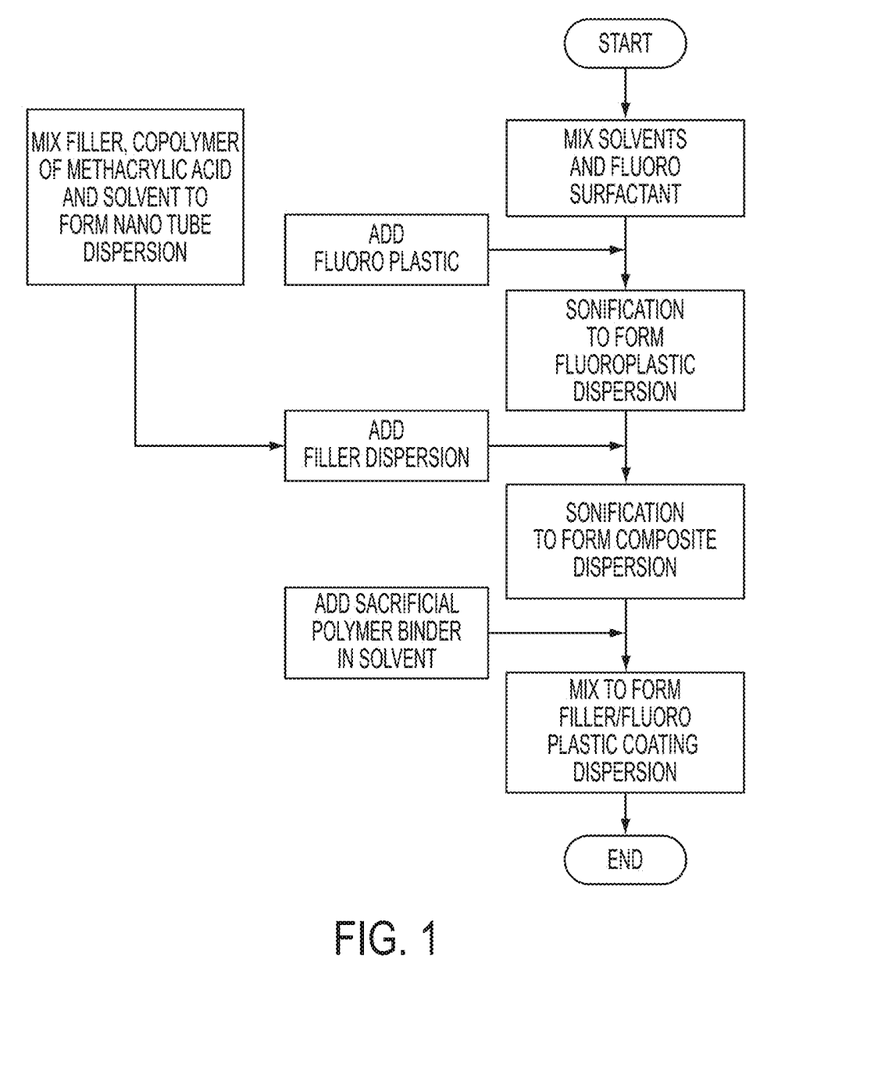
FIG. 1 illustrates a process for making a composite dispersion, according to an embodiment of the present disclosure.

The first dispersion, the second dispersion and the sacrificial polymeric binder can be mixed in any suitable manner to form the homogenous composite dispersion. For example, the filler dispersion can be mixed with the fluoroplastic dispersion, and then the sacrificial binder material can be added and mixed to form the final composite dispersion. An example of such a process is shown by the flowchart of FIG. 1. Alternatively, the sacrificial binder can be mixed with the fluoroplastic dispersion, followed by mixing with the filler dispersion.

The nanotubes remain well dispersed after mixing with the fluoroplastic dispersion to form the composite dispersion. An SEM of an example dispersion of 2% by weight CNT/2% by weight poly(tert-butyl acrylate-co-ethyl acrylate-co-methacrylic acid) and MEK showed CNTs were dispersed around PFA particles.

It is believed that the sacrificial binder in the formulations of the present disclosure can help stabilize the coating dispersions and provide good leveling properties for flow-coating. The formulations can be optimized by controlling the binder content, dispersant loading and solid content to achieve the desired dispersion stability and flow-coatability.

Coating Method

The composite dispersions of the present disclosure can be applied using flow coating methods. In an embodiment, the dispersion can be flow coated onto a substrate. In another embodiment, the dispersion can be flow coated with a silicone layer onto a substrate in an all-in-one manufacturing fashion.

After flow coating the disclosed dispersion onto a substrate, the coated substrate can subsequently be heated to a first temperature to remove solvent, and then heating to a second temperature at or above the melting point of the sacrificial polymeric binder and the fluoroplastic. For example, the coated substrate can be heated to a first temperature above 80° C., such as a temperature ranging from about 100° C. to about 280° C., such as from about 140° C. to about 230° C., for example from about 150° C. or 160° C. to about 180° C. While the first temperature removes solvents, some amount of solvent can remain in the coatings, such as trace amounts.

The coated substrate can be heated to a second temperature that is greater than 250° C., such as a temperature ranging from about 285° C. to about 380° C., such as from about 300° C. to about 360° C., for example from about 310° C. or about 330° C. to about 340° C. or about 350° C. It is believed that heating to the second temperature removes (e.g., by decomposing, evaporating, burning away, or the like) most or all of the sacrificial polymeric binder from the topcoat layer. However, a small amount, such as a trace amount, of the binder may be left in the topcoat layer due to incomplete removal. In an aspect, after heating to the second temperature, the sacrificial binder can be present in the topcoat layer in an amount ranging from about 0% to about 5% by weight, for example from about 0.1 to about 3 wt. %, such as from about 0.5 to about 1 wt. %, relative to the total weight of the topcoat layer after heating. In an embodiment, there is less than 1 wt. % of the binder remaining in the topcoat, such as less that 0.5% or less than 0.1 wt % or 0.01 wt %. In an embodiment, no binder remains in the topcoat. An example of a binder that substantially completely or completely decomposes so as not to remain in the final product is PPC from Empower Materials, which is discussed above. PPC can completely decompose to water and carbon dioxide at 200-300° C. In an embodiment, the PPC binder does not exist, or only exists in trace amounts, such as less that 0.5 wt %, in the final topcoat.

In an embodiment, heating to the second temperature can also melt the fluoroplastic to form a continuous coating, i.e., topcoat layer. In an alternative embodiment, the second temperature is below the melting point of the fluoroplastic, and thus will not melt it, but will remove the sacrificial binder. In this case, a third heating step at a temperature at or above the melting point of the fluoroplastic can be employed to melt the fluoroplastic after the sacrificial binder is removed. Thus, for example, a stepped heating process can be employed, such as heating at an intermediate temperature (e.g., a temperature at or above the melting point of the sacrificial polymeric binder but below the melting point of the fluoroplastic) for removing the sacrificial polymer binder, followed by heating to a higher temperature (e.g., a temperature at or above the melting point of the fluoroplastic) for a time period to provide the desired melting of the fluoroplastic.

The topcoat layer can have a desirably low surface energy, for example, about 25 mN/m² or less, such as a surface energy ranging from about 25 mN/m² to about 1 mN/m², or from about 22 mN/m² to about 5 mN/m², or from about 20 mN/m² to about 10 mN/m². This low surface energy can control surface release performance, for example of a fuser member in an electrophotographic printing device.

The topcoat layer can possess desirable mechanical properties. For example, the topcoat layer can have a tensile strength ranging from about 500 psi to about 5,000 psi, or from about 1,000 psi to about 4,000 psi, or from about 1,500 psi to about 3,500 psi; an elongation % ranging from about 20% to about 1000%, or from about 50% to about 500%, or from about 100% to about 400%; a toughness ranging from about 500 in.-lbs./in.³ to about 10,000 in.-lbs./in.³, or from about 1,000 in.-lbs./in.³ to about 5,000 in.-lbs./in.³, or from about 2,000 in.-lbs./in.³ to about 4,000 in.-lbs./in.³; and an initial modulus ranging from about 100 psi to about 2,000 psi, or from about 500 psi to about 1,500 psi, or from about 800 psi to about 1,000 psi.

The topcoat layer can have a desirable thermal diffusivity ranging from about 0.01 mm²/s to about 0.5 mm²/s, or from about 0.05 mm²/s to about 0.25 mm²/s, or from about 0.1 mm²/s to about 0.15 mm²/s, and a desirable average thermal conductivity ranging from about 0.01 W/mK to about 1.0 W/mK, or from about 0.1 W/mK to about 0.75 W/mK, or from about 0.25 W/mK to about 0.5 W/mK.

In embodiments, the topcoat layer can be used in any suitable electrophotographic members and devices. For example, the topcoat layer can be used for a printer member in electrophotographic devices including, but not limited to, a fuser member, a pressure member, and/or a donor member. The topcoat layer can have any desired thickness. Examples of suitable thicknesses include a thickness ranging from about 50 nm to about 3 µm, or from about 100 nm to about 3 µm, or from about 500 nm to about 2 µm.

The printer member can be in a form of, for example, a roll, a drum, a cylinder, or a roll member as shown in FIGS. 2A-2B and FIGS. 3A-3B. In some embodiments, the printer member can be in a form of a belt, a drelt, a plate, a sheet, or a belt member as shown in FIGS. 4A-4B and FIGS. 5A-5B.

Figure 2A:
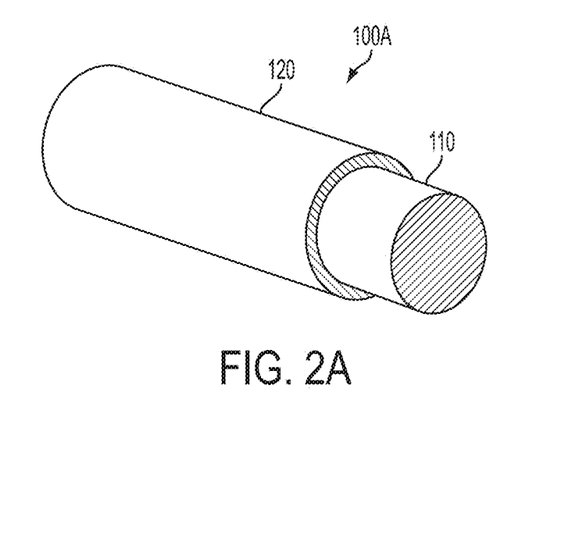
FIGS. 2A-2B depict exemplary fuser rolls disclosed herein in accordance with various embodiments of the present teachings.
Figure 2B:
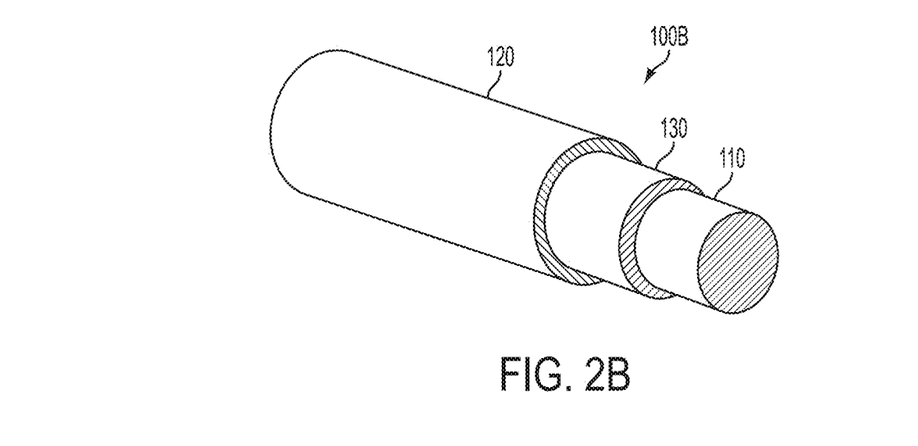

Referring to FIGS. 2A-2B, the fuser member 100A-B can include a substrate 110 and a topcoat layer 120 formed over the substrate 110. The topcoat layer 120 can include, for example, the flow-coatable fluoroplastics described herein.

In embodiments, the substrate 110 can be a cylindrical substrate taking the form of a cylindrical tube, e.g., having a hollow structure including a heating lamp therein, or a solid cylindrical shaft. The substrate 110 can be made of a material including, but not limited to, a metal, a polymer (e.g., plastic), and/or a ceramic. For example, the metal can include aluminum, anodized aluminum, steel, nickel, and/or copper. The plastic can include, for example, polyimide, polyester, polyketone such as polyetheretherketone (PEEK), poly (arylene ether), polyamide, polyaramide, polyetherimide, polyphthalamide, polyamide-imide, polyphenylene sulfide, fluoropolyimide and/or fluoropolyurethane.

The topcoat layer 120 can be formed directly on the substrate 110 as exemplarily shown in FIG. 2A. In various embodiments, one or more additional functional layers, depending on the member applications, can be formed between the topcoat layer 120 and the substrate 110. For example, the member 100B can have a 2-layer configuration having a compliant/resilient layer 130, such as a silicone rubber layer, disposed between the topcoat layer 120 and the substrate 110. In another example, the exemplary fuser member can include an adhesive layer (not shown), for example, formed between the resilient layer 130 and the substrate 110 or between the resilient layer 130 and the topcoat layer 120.

Fuser Apparatus

Exemplary embodiments provide materials and methods for producing a fuser member and a fusing apparatus used in electrophotographic printing devices. The fuser member can include a topcoat comprising a fluoroplastic applied by flow coating methods (also referred to herein as a "flow coatable fluoroplastic") to provide desirable surface properties suitable for fusing processes.

Figure 3A:
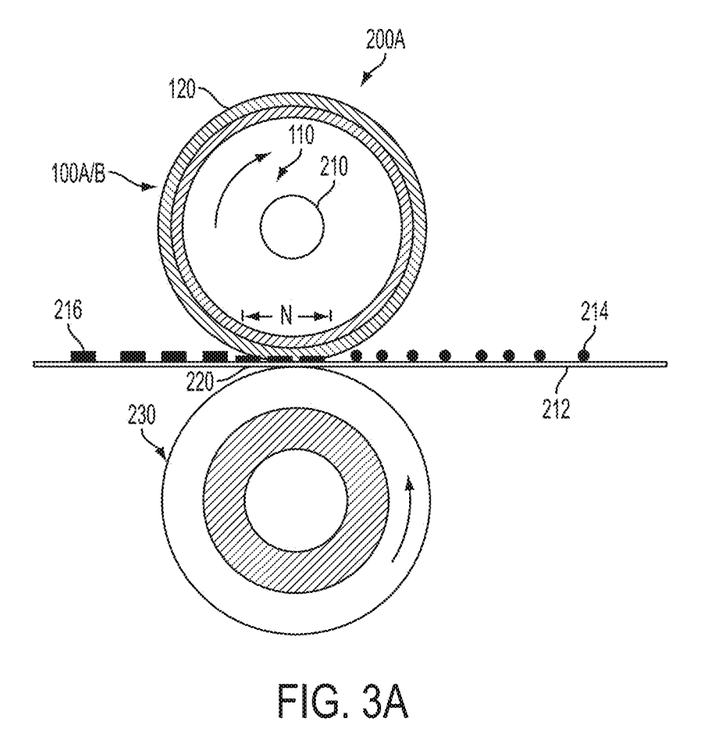
FIGS. 3A-3B depict exemplary fusing apparatuses having the fuser rolls of FIGS. 2A-2B in accordance with various embodiments of the present teachings.
Figure 3B:
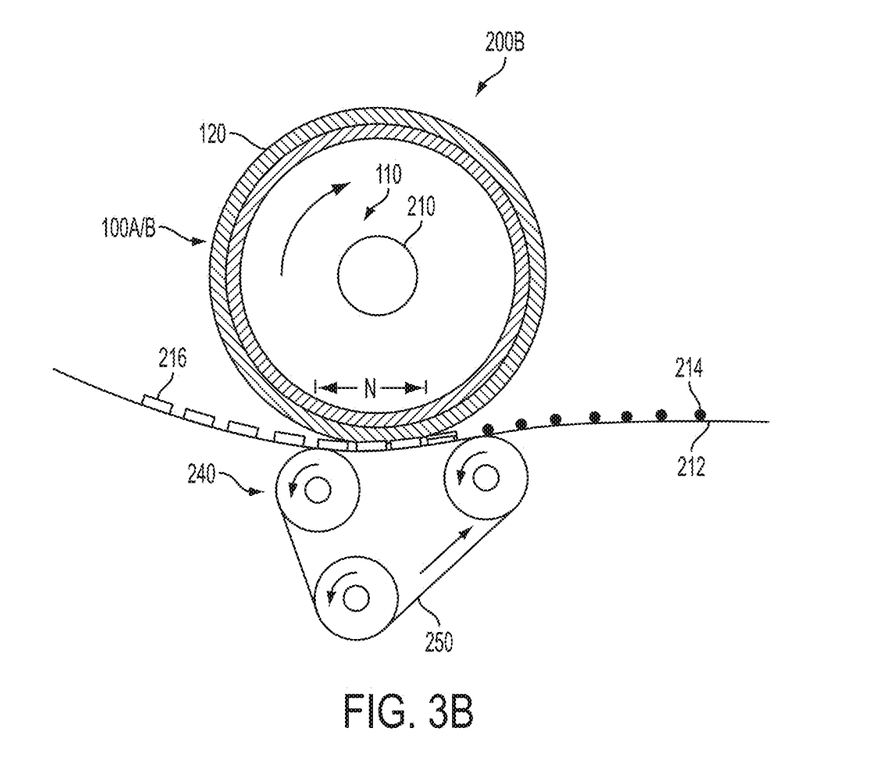

As disclosed herein, the exemplary fuser member 100A-B can be used in a conventional fusing system to improve fusing performances. FIGS. 3A-3B depict exemplary fusing apparatuses 200A-B using the disclosed member 100A or 100B of FIGS. 2A-2B.

In an embodiment, a fuser member can be manufactured by flow coating a substrate, a silicone layer over the substrate, and a PFA topcoat layer over the silicone layer, all in a single manufacturing process.

The exemplary fusing apparatuses 200A-B can include the exemplary fuser member 100A/B having a topcoat layer 120 over a suitable substrate 110, e.g., a hollow cylinder fabricated from any suitable metal. The fuser member 200A/B can further be incorporated with a suitable heating element 210 disposed in the hollow portion of the substrate 110 which is coextensive with the cylinder. Backup (or pressure) roll 230 (see FIG. 3A) or a backup (or pressure) belt 250 (see FIG. 3B) can cooperate with the fuser member 200A/B to form a contact nip N through which a print medium 212 such as a copy paper or other print substrate passes, such that toner images 214 on the print medium 212 contact the topcoat layer 120 during the fusing process. The mechanical component can include one or more rolls cooperated to move the pressure belt 218. The fusing process can be performed at any suitable temperature, such as a temperature ranging from about 60° C. (140° F.) to about 300° C. (572° F.), or from about 93° C. (200° F.) to about 232° C. (450° F.), or from about 160° C. (320° F.) to about 232° C. (450° F.). Following the fusing process, after the print medium 212 passing through the contact nip N, fused toner images 216 can be formed on the print medium 212.

Figure 4A:
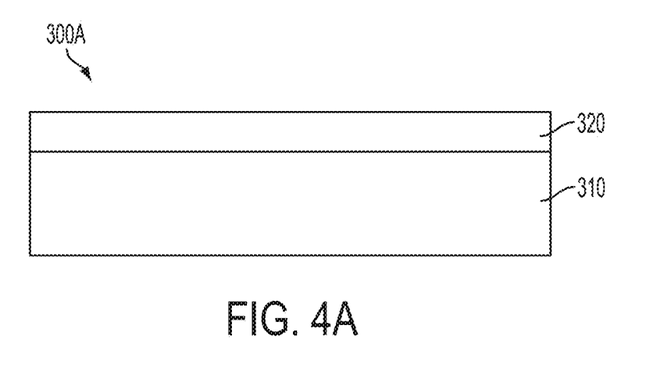
FIGS. 4A-4B depict exemplary fuser belts disclosed herein in accordance with various embodiments of the present teachings.
Figure 4B:
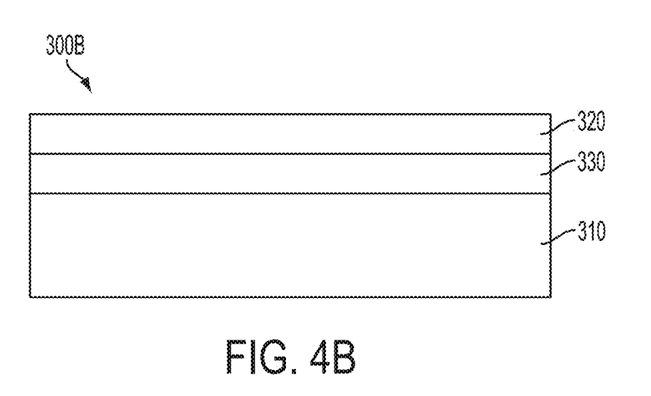

In embodiments, the fuser member can be a fuser belt having a topcoat layer 320 formed over a belt substrate 310 as shown in FIGS. 4A-4B. In other embodiments, a layer 330 (e.g., a compliant/resilient layer or adhesive layer) can be disposed between the topcoat layer 320 and the substrate 310. As described herein, the topcoat layer 320 can include the flow-coatable fluoroplastics disclosed herein.

Compared with the fuser rolls 100A-B shown in FIGS. 2A-2B, the fuser belts 300A-B can have the belt substrate 310. The belt substrate 310 can be any suitable belt substrate as known to one of ordinary skill in the art. For example, the belt substrate 310 can include high temperature plastics that are capable of exhibiting a high flexural strength and high flexural modulus. The belt substrate 310 can alternatively include a film, sheet, or the like and can have a thickness ranging from about 25 micrometers to about 250 micrometers. The belt substrate 310 can include, for example, polyimide, polyester, polyketone such as polyetheretherketone (PEEK), poly(arylene ether), polyamide, polyaramide, polyetherimide, polyphthalamide, polyamide-imide, polyphenylene sulfide, fluoropolyimide and/or fluoropolyurethane.

Figure 5A:
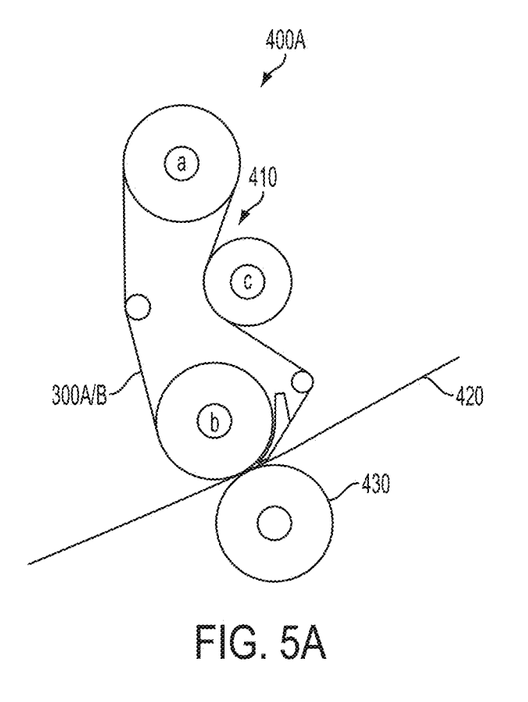
FIGS. 5A-5B depict exemplary fusing apparatuses having the fuser belts of FIGS. 4A-4B in accordance with various embodiments of the present teachings.
Figure 5B:
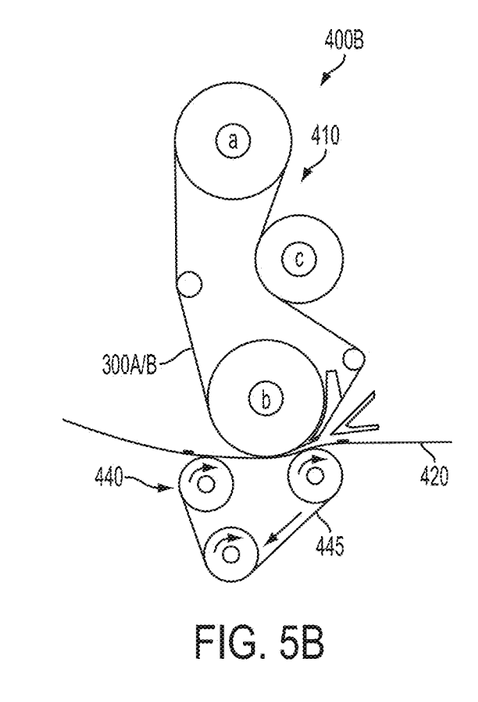

FIGS. 5A-5B depict exemplary fusing apparatuses 400A-B using the fuser belt shown in FIGS. 4A-4B in accordance with various embodiments of the present teachings. The apparatus 400A/B can include a fuser belt 300A/B that forms a contact nip with, for example, a pressure roll 430 in FIG. 5A or a pressure belt 445 of FIG. 5B. A print medium 420 having unfixed toner images (not illustrated) can then pass through the contact nip N to fuse the unfixed toner images on the print medium 420. In embodiments, the pressure roll 430 or the pressure belt 445 can be used in a combination with a heat lamp to provide both the pressure and heat for fusing the toner images on the print medium 420. In addition, the apparatus 400A/B can include a mechanical component 410 to move the fuser belt 300A/B and thus fusing the toner images and forming images on the print medium 420. The mechanical component 410 can include one or more rolls 410a-c, which can also be used as heat rolls when needed.

In an aspect, there is disclosed herein a method of producing a fuser member, including providing a substrate; providing a composite dispersion, as described herein; applying the composite dispersion to the substrate by flow coating to form a topcoat; and heating the topcoat as described above.

In another aspect, there is disclosed a fuser apparatus including a fuser member. The fuser member can include a substrate and a topcoat layer, wherein the topcoat layer includes a flow-coated fluoroplastic made by flow-coating the composite dispersions of the present application, wherein the topcoat has a surface energy of about 25 mN/m² or less. The fuser apparatus can further include a pressure member configured to form a contact nip with the topcoat layer of the fuser member to fuse toner images on a print medium that passes through the contact nip Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

EXAMPLES

Example 1

Composite Dispersion Preparation

Example 1A

A CNT dispersion was prepared as follows: 1.6 g Multi Walled CNT (Cheaptubes) was dispersed in 80 g MEK solution containing 0.8 g poly(tert-butyl acrylate-co-ethyl acrylate-co-methacrylic acid) (Sigma, 444790) with sonication for 5 hours with 60% output to form 2% CNT/1% CoPolymer/MEK dispersion. The dispersion was found to be stable.

Example 1B

A PFA dispersion was prepared as follows: 0.4 g GF400 (25% in MEK), available from Toagosei Chemical Industries, was added to 4.4 g cyclohexanone ("CHN") and rolled for dissolving. 10 g PFA powder (Dupont, PFA320) was added to the solution with sonication.

Example 1C 2 wt % CNT/PFA composite coating dispersion was prepared by mixing 10 g of the 2wt % CNT/1%/CoPolymer/MEK dispersion of Example 1A with the above PFA/CHN dispersion of Example 1B with sonication to form a homogeneous composite coating dispersion. 3.75 g MEK solution of 20% poly(propylene carbonate) (PPC) (Empower Materials—QPAC® 40) with molecular weight of 265,000 g/mol, was added to the composite dispersion with roll mill to form the stable coating dispersion containing 35 wt % of PFA and 7.5 wt % of a poly(propylene carbonate)), relative to the total weight of the composite coating dispersion.

Example 2

Flow Coating Process

The composite coating dispersion of Example 1C was applied onto a primed silicone rubber substrate fuser roll by flow coating at the RPM 123, coating speed of 2 mm/s, flow rate of 3.8 ml/min and the blade y-position of 56.5 cm, which enabled a good contact of the blade to the roll without too much pressure.

Figure 9:
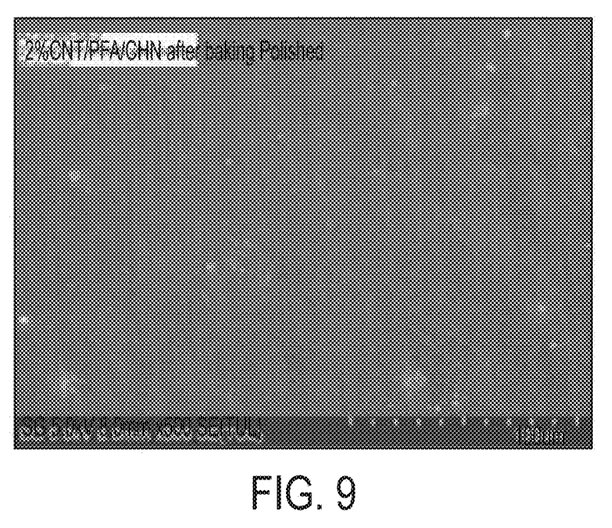
FIG. 9 shows an SEM image of a 2 wt % CNT/PFA coating made using a methacrylic acid copolymer as a dispersant, according to an example of the present disclosure.
Figure 10:
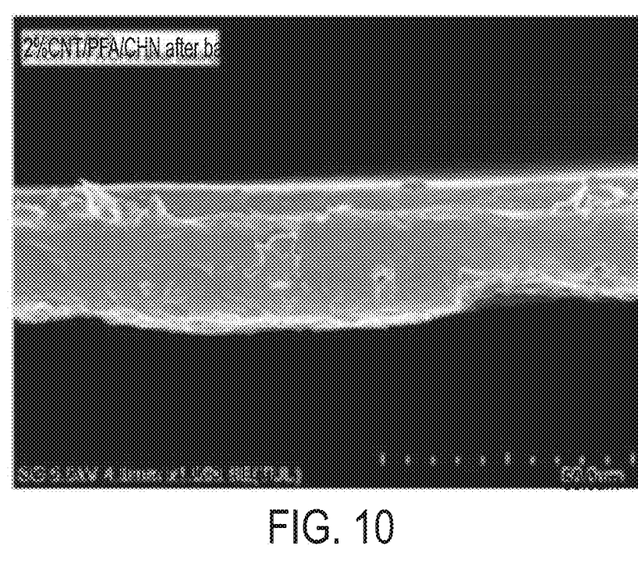
FIG. 10 shows a cross-section of the coating of FIG. 9.
Figure 11:
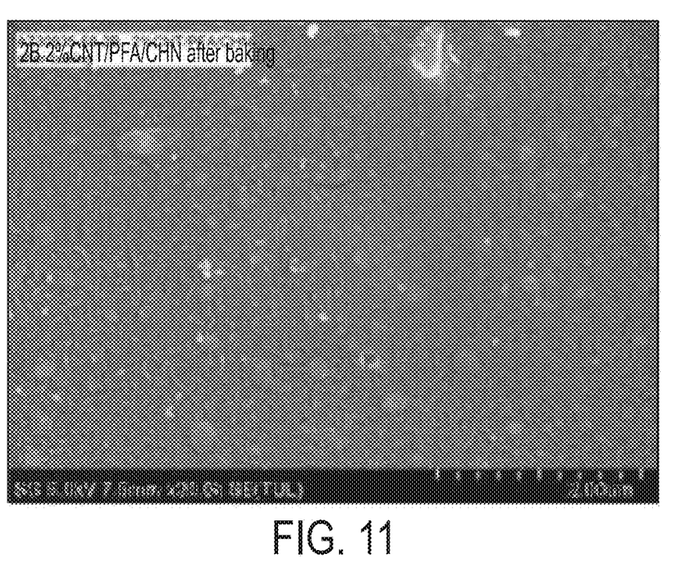
FIG. 11 shows a larger magnification of the coating of FIG. 9.

After air-drying, the composite coating was baked for 1 hour at 160° C. to remove any residual solvent, and baked above the melting temperature of PFA (e.g. 330° C.) for 15 minutes to cure. SEM images illustrated good coating quality was achieved. As shown in FIGS. 9-11, the problem of large voids and/or large agglomerates reported for the coating of Comparative Example 1, as discussed below, was substantially and unexpectedly reduced.

Comparative Example 1

Figure 6:
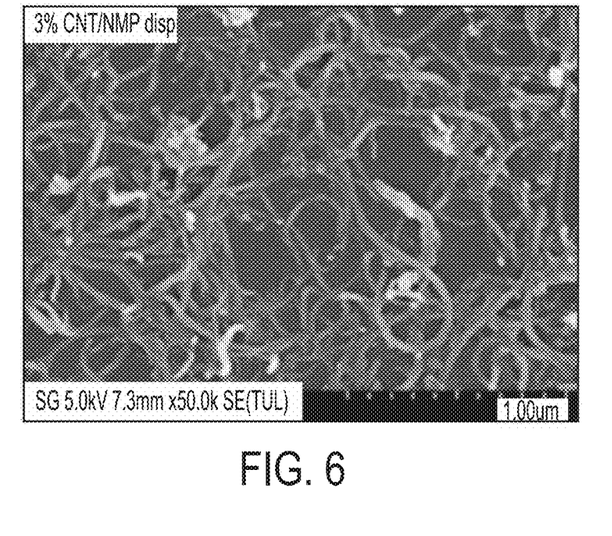
FIG. 6 shows an SEM image of a 3 wt % CNT/N-Methyl-2-pyrrolidone ("NMP") dispersion showing the exfoliated CNTs were well dispersed in NMP.
Figure 7:
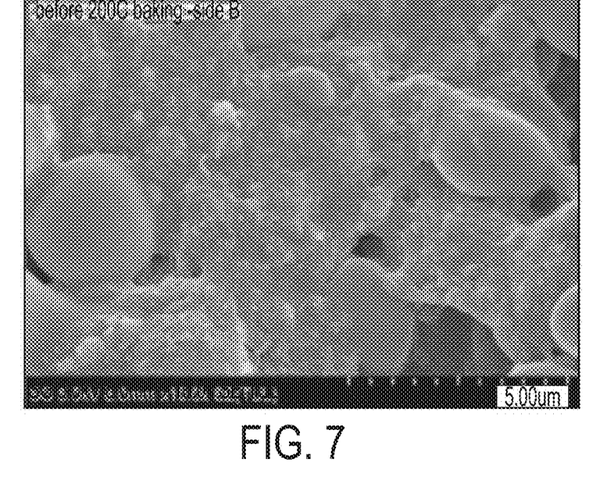
FIG. 7 shows an SEM image of a 2 wt % CNT/PFA dispersion showing the CNTs are uniformly distributed around PFA particles.
Figure 8A:
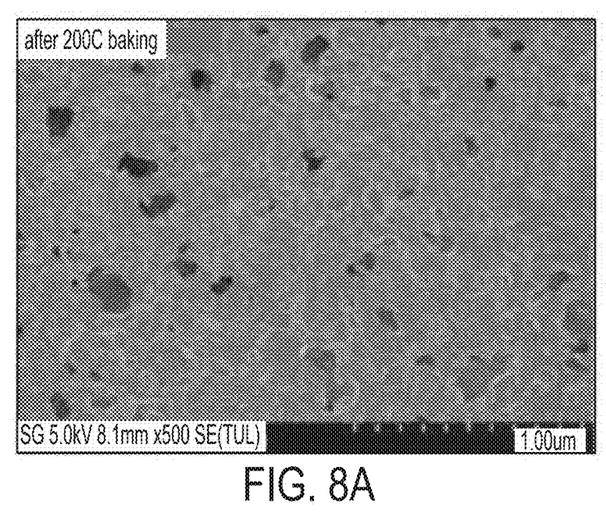
FIGS. 8A and 8B are SEM images of a CNT/PFA coating made from the dispersion of FIG. 7 showing large voids on the surface (FIG. 8A) and agglomerates (FIG. 8B) throughout the coating after a high temperature baking process.
Figure 8B:
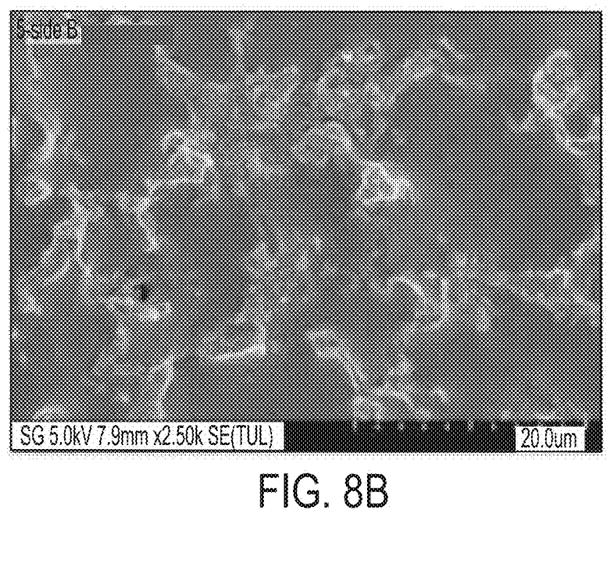

A flow-coatable PFA formulation that contained poly(alkyl carbonate) (PAC) as a transient binder in ketone system was made, similar to those disclosed in U.S. Pat. No. 8,588,669, which is herein incorporated by reference in its entirety. A commercially available CNT dispersion in organic system identified as 3 wt % MWCNT in N-Methyl-2-pyrrolidone ("NMP") dispersion (available from Nanostructured & Amorphous Materials Inc.) was incorporated into the PFA formulation. SEM imaging showed the exfoliated CNTs were well dispersed in NMP. (FIG. 6) When mixed with PFA particles in ketone solvents, such as methyl ethyl ketone (MEK) and cyclohexanone (CHN), the dispersion is compatible without separation. CNTs are uniformly distributed around PFA particles. (FIG. 7) The flow-coatability is not affected either. But the coating shows large voids on the surface and agglomerates throughout the coating after high temperature baking process, which indicates the incompatibility of the CNT dispersion system. (FIGS. 8A, 8B).

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A homogenous composite dispersion made from ingredients comprising:
    a first dispersion comprising a filler dispersed in a liquid continuous phase, the filler selected from the group consisting of nanotubes, graphene or a combination thereof, the liquid continuous phase comprising an acid copolymer and a first solvent, the acid copolymer comprising at least one carboxyl functionalized polymeric unit and at least one carboxylate ester functionalized polymeric unit having an alkyl or fluorinated alkyl attached to an oxygen atom of the carboxylate ester;
    a second dispersion comprising a fluoroplastic dispersed in a second solvent; and
    a sacrificial polymeric binder material.

2. The composite dispersion of claim 1, wherein the filler comprises carbon nanotubes.

3. The composite dispersion of claim 1, wherein the acid copolymer is a compound of general formula 1:

(1)

where R', R" and R'" are independently selected from the group consisting of a proton, methyl, ethyl, propyl and butyl groups; $R^1$ and $R^2$ are independently selected from the group consisting of an alkyl having 1 to 12 carbon atoms and a fluorinated alkyl having 1 to 12 carbon atoms; and x, y and z represent the number of each polymeric unit in the acid copolymer.

4. The composite dispersion of claim 1, wherein the first solvent is selected from the group consisting of acetone, methylethylketone, cyclohexanone, ethyl acetate, methoxy ethyl ether, methylene chloride, and combinations thereof.

5. The composite dispersion of claim 1, wherein the fluoroplastic is selected from the group consisting of polytetrafluoroethylene (PTFE), perfluoroalkoxy polymer resin (PFA), poly(tetrafluoroethylene-co-perfluoropropyl vinyl ether), fluorinated ethylenepropylene copolymer (FEP); and combinations thereof.

6. The composite dispersion of claim 1, wherein the fluoroplastic comprises a perfluoroalkoxy polymer resin (PFA).

7. The composite dispersion of claim 1, wherein the sacrificial polymeric binder is a poly(alkylene carbonate) selected from the group consisting of poly(propylene carbonate), poly (ethylene carbonate), poly(butylene carbonate), poly(cyclohexene carbonate), and combinations thereof.

8. The composite dispersion of claim 7, wherein the poly (alkylene carbonate) comprises a weight average molecular weight ranging from about 50,000 to about 500,000.

9. The composite dispersion of claim 1, wherein the second solvent is selected from the group consisting of acetone, methylethylketone, cyclohexanone, ethyl acetate, methoxy ethyl ether, methylene chloride, and combinations thereof.

10. The composite dispersion of claim 1, wherein the composite dispersion further comprises an additive selected from the group consisting of silica, clay, metal oxides, nanoparticles, carbon nanotubes, carbon nanofibers, and combinations thereof.

11. The composite dispersion of claim 1, wherein the sacrificial polymeric binder is present in the dispersion in an amount ranging from about 1 to about 30 percent, based on the amount of total solids in the dispersion.

12. The composite dispersion of claim 1, wherein the fluoroplastic is present in the composite dispersion in an amount ranging from about 20 to about 60 percent, based on the total weight of the composite dispersion.

13. A method of producing a fuser member, the method comprising:
    providing a substrate;
    providing a first dispersion comprising a filler dispersed in a liquid continuous phase, the filler selected from the group consisting of nanotubes, graphene or a combination thereof and the liquid continuous phase comprising an acid copolymer and a first solvent, the acid copolymer comprising at least one carboxyl functionalized polymeric unit and at least one carboxylate ester functionalized polymeric unit having an alkyl or fluorinated alkyl attached to an oxygen atom of the carboxylate ester;
    providing a second dispersion comprising a fluoroplastic and a second solvent;
    mixing the first dispersion, the second dispersion and a sacrificial polymeric binder to form a homogenous composite dispersion;
    applying the composite dispersion to the substrate by flow coating to form a topcoat;
    heating the topcoat to a first temperature ranging from about 100° C. to about 280° C.; and
    heating the topcoat to a second temperature ranging from about 285° C. to about 380° C. to form a uniform topcoat on a fuser member.

14. The method of claim 13, wherein the acid copolymer is a compound of general formula 1:

(1)

where R', R" and R'" are independently selected from the group consisting of a proton, methyl, ethyl, propyl and butyl groups; $R^1$ and $R^2$ are independently selected from the group consisting of an alkyl having 1 to 12 carbon atoms and a fluorinated alkyl having 1 to 12 carbon atoms; and x, y and z represent the number of each polymeric unit in the acid copolymer.

15. The method of claim 13, wherein the fluoroplastic is selected from the group consisting of polytetrafluoroethylene (PTFE), perfluoroalkoxy polymer resin (PFA), poly(tetrafluoroethylene-co-perfluoropropyl vinyl ether), fluorinated ethylenepropylene copolymer (FEP); and combinations thereof.

16. The method of claim 13, wherein the sacrificial polymeric binder is a poly(alkylene carbonate) selected from the group consisting of poly(propylene carbonate), poly(ethylene carbonate), poly(butylene carbonate), poly(cyclohexene carbonate), and combinations thereof.

17. The method of claim 13, wherein the fluoroplastic is present in the composite dispersion in an amount ranging from about 20 to about 60 percent, based on the total weight of the composite dispersion.

18. The method of claim 13, wherein the topcoat of the fuser member comprises less than 1% by weight of the sacrificial polymeric binder after heating to the second temperature, relative to the total weight of the topcoat after heating.

\* \* \* \* \*